July 2, 1968 H. P. PELOSCHEK 3,390,451

MULTI-TRACK MAGNETIC HEADS AND THEIR METHOD OF MANUFACTURE

Filed April 30, 1963

INVENTOR.
HANS P. PELOSCHEK
BY Frank R. Trifari
AGENT 3,390,451

MULTI-TRACK MAGNETIC HEADS AND THEIR METHOD OF MANUFACTURE

Hans Peter Peloschek, Emmasingel, Eindhoven, Netherlands, assignor to North American Philips Company, Inc., New York, N.Y., a corporation of Delaware Filed Apr. 30, 1963, Ser. No. 276,837
Claims priority, application Netherlands, May 4, 1962, 278,094
1 Claim. (Cl. 29—603)

This invention relates to multi-track magnetic heads and to a method of manufacturing such heads. Tolerances in the depths of individual magnetic heads and variability in the adhesive layers between the individual heads lead to a fairly large stacking tolerance and consequently relatively large dimensional differences when the individual heads are stacked and cemented together to form a multi-track head. This creates a difficulty if uniform mechanical and electrical characteristics are required.

It is a primary object of the invention to provide multi-track magnetic heads which are substantially uniform in characteristics.

According to one aspect of the invention, a holder is provided which is substantially U-shaped and rectangular in cross-section and is made of a non-magnetizable material, preferably non-magnetizable ferrite. The center portion of the holder is ground flat and is provided with slots which are cut through the center portion and extend at right angles to the sides; each slot has a width which is equal to the gap width of an individual head. Each finished head is inserted into a particular slot through such a distance that the surface of the head is accurately located in the surface of the center portion of the holder, after which all the individual heads and the holder are joined together by cementing; the surface of the multi-track magnetic head thus assembled may be suitably rounded, if desired.

According to another aspect of the invention, narrower slots for screening plates are provided between the slots for the separate heads, said screening plates also being joined together with the holder and the individual heads by cementing.

In accordance with another feature of the invention the open sides of the holder and, if desired, the lower side, may be closed by plates of non-magnetizable material cemented to the holder.

In order that the invention may readily be carried into effect, one embodiment thereof will now be described, by way of example, with reference to the accompanying drawing, in which.

Figure 1:
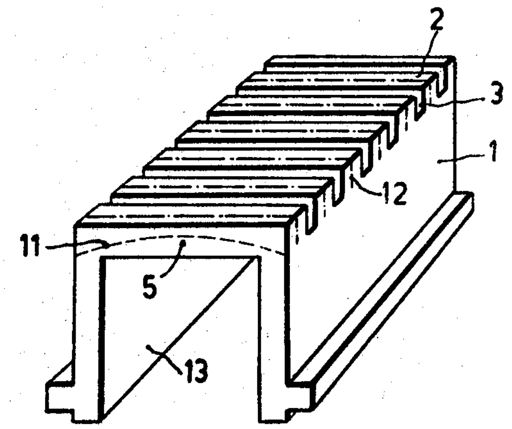
FIG. 1 shows a holder for the manufacture of a multi-track magnetic head.
Figure 2:
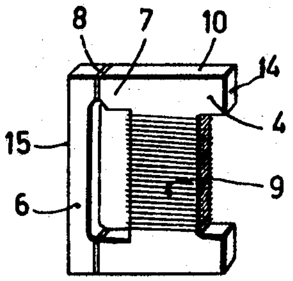
FIG. 2 shows an individual finished head suitable for insertion in the holder of FIG. 1.

Reference numeral 1 indicates a holder having a U-shaped cross-section manufactured from non-magnetizable ferrite. The outer surface 2 of this holder is ground flat and slots 3 are provided therein, for example by milling; with width of each slot 3 is the same as the thickness of a head 4 to be placed in the slot and the slots are so deep that the center portion 5 of the holder 1 is cut through entirely. The head 4 may consist of a magnetic circuit part 6 and a magnetic closing piece 7. Between these two members there is located an operating gap 8, which may be filled in known manner with a non-magnetizable material, for example glass. The closing piece 7 is provided with a coil 9. Before placing the coil 9 on the closing piece, the parts 6 and 7 are ground flat and the thickness of these parts is made equal to the width of a slot 3. The surface 10 of the head 4 is preferably ground flat. Then a number of these heads 4 are cemented in the slots 3 in a manner such that the surfaces 10 are accurately located in the surface 2. Finally, if desired, the surfaces 2 and 10 may be rounded off as shown by reference numeral 11. In this manner, the separate heads 4 are accurately located at the desired track-distance from each other. If the heads 4 were stacked and cemented by means of spacing plates, the stacking tolerance due to the dimensional differences which always exist in the thicknesses of the heads 4 and the spacing plates, would become far too large; the thickness of the cement is also variable, thus further contributing to the stacking tolerance.

The method described also makes it possible to render the gap heights of all the individual heads accurately the same size by grinding the surface 2, as a result of which the electrical characteristics of all tracks of the composite head may be adjusted to be substantially the same.

Slots 12, which are narrower than slots 3, may also be provided; screening plates may then be cemented in the grooves 12.

The sides of the holder 1 may be closed with side plates cemented against it, which plates also consist of non-magnetizable ferrite. The use of this material for the holder has the advantage that non-magnetizable ferrite, has little, mechanical variation so that no warping or tearing occurs in operation. In addition, the individual heads are generally composed of ferrite; therefore, if the holder is likewise composed of ferrite the material properties, as regards processibility and expansion of heads and holder, are equal. The multi-track head composed as described will always maintain the desired shape of its surface at different temperatures and humidity of the ambient air.

If desired, the inner surfaces 13 on either side and the surfaces 14 and 15 of the heads may be ground flat or milled, so that the heads are supported by the inner surfaces 13. However, this has not appeared to be necessary in practice. It has appeared in practice that if, for example, material which is marked under the registered trade name "Araldite" is used as a cement, the heads will be rigidly connected in the grooves 3.

While the invention has been described with respect to specific embodiments, it will be appreciated that various changes and modifications thereof will be readily apparent to those skilled in the art without departing from the inventive concept, the scope of which is set forth in the appended claims.

I claim:

1. A method of forming a multi-track magnetic head with a plurality of finished magnetic heads having gap and body portions, each of said heads being spaced from one another within relatively small stacking tolerances and bonded to a holder composed of a single rigid non-magnetic ferrite unit having an open end, a closed end defined by inner and outer surfaces forming a center portion and engaged by substantially parallel side portions each defined by planar inner and outer surfaces which form a substantially rectangular U-shaped cross-section, comprising the steps of: grinding the outer surface of the center portion of said rigid holder substantially flat; milling from said outer surface of the center portion to cut at right angles to said side portions a first plurality of parallel, equally spaced, equal width, equal length, head receiving slots in the center portion of said holder, each slot of said first plurality of slots being respectively milled through to the inner surface of the center portion to orthogonally intersect and expose said inner side portion surfaces, each said slot having a minimum length equal to the distance between said inner side portion surfaces and a width equal to the gap width and body thickness of a finished ferrite magnetic head;

milling a second plurality of equally spaced, parallel screening plate receiving slots into the material of the center portion defining said first plurality of slots, each of said plate receiving slots being formed parallel to said first plurality of slots and between adjacent ones thereof; inserting an individual finished ferrite magnetic head having a gap containing planar front surface defined by assembled magnetic circuit body portions, between said inner surfaces of said side portions from the open end of said U-shaped cross-section into each slot of said first plurality of slots until each said front surface of each individual magnetic head is substantially coplanar with said outer surface of said center portion of the holder to render said relatively small stacking tolerance and result in each head body portion being disposed between said inner surface; inserting a screen plate into each of said plate receiving slots; cementing said holder, the assembled gap containing heads, and the assembled screen plates together; and rounding off said coplanar front and outer surfaces of the cemented assembly.

References Cited

UNITED STATES PATENTS

| | | | |
|---|---|---|---|
| 2,756,280 | 7/1956 | Rettinger | 29—155.5 |
| 3,026,379 | 3/1962 | Carpenter | 179—100.2 |
| 3,156,919 | 11/1964 | Rutter | 346—74 |
| 3,229,355 | 1/1966 | Hluszko | 29—155.5 |

FOREIGN PATENTS

| | | |
|---|---|---|
| 1,245,276 | 1/1960 | France. |

JOHN F. CAMPBELL, *Primary Examiner.*

R. W. CHURCH, J. W. BOCK, *Assistant Examiners.*